(12) United States Patent  
Koley et al.

(10) Patent No.: US 9,225,614 B2
(45) Date of Patent: Dec. 29, 2015

(54) SERVICE AND APPLICATION LAYER OPTIMIZATION USING VARIABLE RATE OPTICAL TRANSMISSION

(75) Inventors: Bikash Koley, Sunnyvale, CA (US); Vijayanand Vusirikala, Palo Alto, CA (US); Hong Liu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 273 days.

(21) Appl. No.: 13/298,796

(22) Filed: Nov. 17, 2011

(65) Prior Publication Data

US 2013/0129350 A1    May 23, 2013

(51) Int. Cl.
| | |
|---|---|
| *H04L 12/24* | (2006.01) |
| *H04J 14/02* | (2006.01) |
| *H04L 5/00* | (2006.01) |
| *H04L 25/02* | (2006.01) |
| *H04L 27/00* | (2006.01) |

(52) U.S. Cl.
CPC ........... *H04L 41/5022* (2013.01); *H04J 14/026* (2013.01); *H04L 5/0008* (2013.01); *H04L 5/0028* (2013.01); *H04L 25/0262* (2013.01); *H04L 27/0008* (2013.01)

(58) Field of Classification Search
None
See application file for complete search history.

(56) References Cited

U.S. PATENT DOCUMENTS

| | | | | |
|---|---|---|---|---|
| 5,208,804 | A * | 5/1993 | Wilson et al. | 370/343 |
| 5,699,361 | A * | 12/1997 | Ding et al. | 370/431 |
| 6,038,609 | A * | 3/2000 | Geulen | 370/401 |
| 6,223,222 | B1 * | 4/2001 | Fijolek et al. | 370/236 |
| 6,862,622 | B2 * | 3/2005 | Jorgensen | 370/338 |
| 6,917,614 | B1 * | 7/2005 | Laubach et al. | 370/392 |
| 7,310,301 | B1 * | 12/2007 | Kleider et al. | 370/465 |
| 7,787,771 | B2 * | 8/2010 | Kim et al. | 370/468 |
| 8,009,985 | B1 | 8/2011 | Roberts et al. | |
| 8,160,072 | B1 * | 4/2012 | Gnanasekaran et al. | 370/389 |
| 8,400,916 | B2 * | 3/2013 | Cutler et al. | 370/230 |
| 2001/0043603 | A1 | 11/2001 | Yu | |
| 2003/0189935 | A1 * | 10/2003 | Warden et al. | 370/412 |
| 2004/0258409 | A1 * | 12/2004 | Sadananda | 398/50 |
| 2005/0122897 | A1 | 6/2005 | Gonda | |
| 2007/0104215 | A1 * | 5/2007 | Wang et al. | 370/458 |
| 2007/0211750 | A1 | 9/2007 | Li et al. | |

(Continued)

OTHER PUBLICATIONS

International Search Report and Written Opinion dated Mar. 29, 2013 for Application No. PCT/US2012/063860.

(Continued)

*Primary Examiner* — Chirag Shah
*Assistant Examiner* — Joshua Smith
(74) *Attorney, Agent, or Firm* — Lerner, David, Littenberg, Krumholz & Mentlik, LLP

(57) ABSTRACT

Apparatus and methods are provided for application layer optimization in a modern data network. The optimization incorporates variable rate transmission across one or more optical data channels. Data throughput is maximized by enabling quality of service profiles on a per transmission channel basis. According to one aspect, a system is provided in which the application layer is aware of and controls the underlying transmission rate and quality of the transmission. This enables the system to fully utilize the transmission capacity of the channel. The application layer may map different applications to different transmission classes of service. The services can be classified based on data throughput rate, guaranteed error rates, latency and cost, among other criteria. This provides flexibility to the application layer to map some loss tolerant applications to a lower cost (per bit) transmission class.

17 Claims, 6 Drawing Sheets

(56) References Cited

U.S. PATENT DOCUMENTS

| | | | |
|---|---|---|---|
| 2007/0263653 A1* | 11/2007 | Hassan et al. | 370/437 |
| 2009/0021572 A1* | 1/2009 | Garudadri et al. | 370/389 |
| 2009/0196602 A1 | 8/2009 | Saunders et al. | |
| 2010/0080245 A1 | 4/2010 | Kisaka et al. | |
| 2010/0195503 A1* | 8/2010 | Raleigh | 370/235 |

OTHER PUBLICATIONS

Allen et al., "Digital Optical Networks Using Photonic Integrated Circuits (PICs) Address the Challenges of Reconfigurable Optical Networks," IEEE Communications Magazine, Jan. 2008, 9 pages.

Hill et al., "Optical Polarization Division Multiplexing at 4 Gb / s," IEEE Photonics Technology Letters, vol. 4, No. 5, May 1992, pp. 500-502.

Kamalov et al., "Field Verification of 40G DPSK Upgrade in a Legacy 10G Network," OSA/OFC/NFOEC 2010, 3 pages.

Koley, "100GbE and Beyond for Datacenter Connectivity," OSA Executive Forum, 2010, 15 pages.

Koley et al., "100GbE and Beyond for Warehouse Scale Computing," 15th OptoElectronics and Communications Conference (OECC2010) Technical Digest, Jul. 2010, Sapporo Convention Center, Japan, 2 pages.

Lam et al., "Fiber Optic Communication Technologies: What's Needed for Datacenter Network Operations," IEEE Communications Magazine, Jul. 2010, pp. 32-39.

Canadian Office Action for Application No. 2855798 dated May 21, 2015.

Extended European Search Report for Application No. 12849912.6 dated May 16, 2015.

Hermsmeyer C et al: "Towards 100G Packet Processing: Challenges and Technologies", Bell Labs Technical Journal, Wiley, CA, US, vol. 14, No. 2, Jul. 1, 2009, pp. 58-79, XP001546637.

* cited by examiner

500

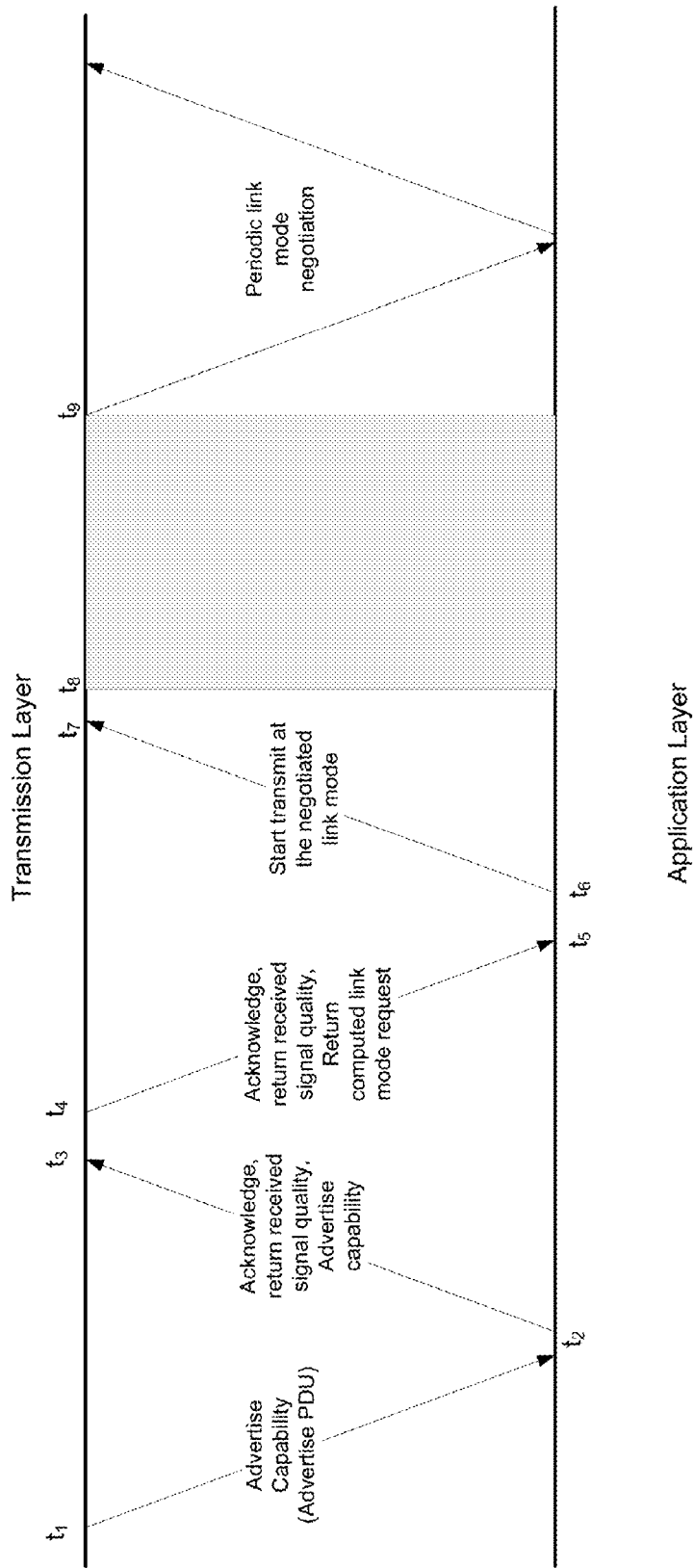
FIG. 6    600

SERVICE AND APPLICATION LAYER OPTIMIZATION USING VARIABLE RATE OPTICAL TRANSMISSION

BACKGROUND

Communication using high-speed optical networks is typically based on a fixed transmission data rate per channel or per line card regardless of the transmission distance. For example, Dense Wavelength Division Multiplexing (DWDM) optical systems typically have a fixed data rate such as 10 Gb/s, 40 Gb/s or 100 Gb/s, where the rate depends on the generation and vintage of the optical equipment. Emerging optical transmission technologies, such as a coherent optical modem, can enable a variable transmission rate where the system transmits at the highest rate that is possible for the transmission channel, in a manner analogous to DSL networks.

However, even with such variable rate systems, the higher layers in the network, including the application layer, cannot easily take advantage of the available higher data rate because the link control layer is fixed and the application layer is blind to the transmission layer. Moreover, in known network architectures, the transmission layer may be abstracted (presented) to the higher layers as single transmission profile that is characterized by the channel throughput and guaranteed bit error rate. Such systems may not provide optimal transmission throughput.

SUMMARY

As discussed herein, aspects of the disclosure are directed to the use of variable rate optical transmission schemes to optimize service and application layers.

In optical communication systems, a trade-off exists between the data rate, distance and energy usage. Systems that are designed for a certain data rate and a certain distance may have a leftover optical margin if run at that data rate over a much shorter distance. Hence, with fixed rate optics, even short links that can potentially be operated at much higher rates may be utilized in a sub-optimal manner. With variable rate transmission techniques, different channels can be configured with different quality of service (QoS) profiles, including a combination of throughput, guaranteed error rate and cost, and the application layer can optimally map the applications to different transmission channels based on the QoS requirements.

Embodiments presented herein provide a method and apparatus for application layer optimization in a modern data network by the use of variable rate optical transmission. For instance, the method may increase the overall network efficiency by maximizing data throughput and by enabling QoS profiles on a per transmission channel. As mentioned above, in typical high-speed optical networks, the data rate of the transmission channel is fixed and cannot be changed to a higher or lower speed based on the conditions of the transmission channel. This limitation of a system based on a fixed rate is sub-optimal in scenarios where the transmission channel is capable of a higher data rate; however, such a system cannot take advantage of it, or the system is over-provisioned for the bandwidth not needed.

According to one aspect of the disclosure, a variable link control apparatus for application layer control of an optical transmission system is provided. The variable link control apparatus comprises a media access control element, a reconciliation sub-layer coupled to the media access control element, a framing element coupled to the media access control element, and a packet buffer coupled to the media access control element. The variable link control apparatus is configured to map from a packet source to a physical transmission system with a variable rate, including managing packet transmission in an optical network using one or more variable rate transmission techniques to configure different channels with different qualities of service.

In one example, the packet buffer is configured to communicate with one or more host computers using quality of service marked packets. In another example, the framing element includes a physical coding sub-layer and an optical transport network sub-layer. Here, the physical coding sub-layer and the optical transport network sub-layer may be coupled to a physical medium attachment sub-layer. In this case, the media access control element, the physical coding sub-layer, the optical transport network sub-layer and the physical medium attachment sub-layer may be part of a packet switch device.

In a further example, the variable link control apparatus further comprises a centralized controller configured to communicate with one or more host computers, a variable rate optical modem, and at least one of the packet buffer and the media access control element to establish one or more data rates, service profiles and quality of service markings. In one alternative, the centralized controller includes configuration profiles to indicate which elements have variable bit rate awareness and limits of such variability. Here, the centralized controller may be configured to determine a balance between an ability of a transmission link and traffic demand to create a match. In another example, one or more data rates, service profiles and quality of service markings are arranged using direct signaling between corresponding functional blocks.

In yet another example, the media access control element is part of a packet switch device. In this case, the variable link control apparatus further comprises a centralized controller configured to communicate with one or more host computers and the packet switch device, and one or more links between the packet switch device and a variable rate optical modem.

In accordance with another aspect of the disclosure, a variable link control system comprises a media access control element, a reconciliation sub-layer coupled to the media access control element, a framing element coupled to the media access control element, a packet buffer coupled to the media access control element, and a variable rate optical modem coupled to the framing element. The variable link control system is configured to map data from a packet source to the variable rate optical modem by using one or more variable rate transmission techniques to configure different channels with different qualities of service.

According to one example, the variable rate optical modem is configured to employ one or more of wavelength division multiplexing, orthogonal frequency division multiplexing, time division multiplexing, and polarization division multiplexing. In another example, the media access control element, the framing element and the variable rate optical modem are part of a packet switch device.

In a further example, the system is configured to advertise capabilities of the variable rate optical modem, perform initial and periodic queries of a transmission medium state to determine possible transmission modes at various quality of service profiles, and negotiate a transmission rate with an application layer.

According to an alternative, the variable link control system further comprises a centralized controller configured to communicate with one or more host computers, the variable rate optical modem, and at least one of the packet buffer and the media access control element to establish one or more data rates, service profiles and quality of service markings. In this case, the centralized controller includes configuration profiles to indicate which elements have variable bit rate awareness and limits of such variability.

In another alternative, signaling is performed between various functional elements of the system to communicate parameters, to establish a data rate and corresponding profile, and to send confirmation messages of an established link. In this case, the signaling may be established using a predetermined base rate. Alternatively, the signaling may be out-of-band signaling. Here, the out-of-band signaling may employ an FM tone.

According to a further aspect of the disclosure, a variable link control apparatus for application layer control of an optical transmission system comprises a media access control element, a reconciliation sub-layer coupled to the media access control element, a framing element coupled to the media access control element, a packet buffer coupled to the media access control element, and application layer management means for mapping data from a packet source to a physical transmission system with a variable rate.

In one example, the application layer management means is configured to manage packet transmission in an optical network using one or more variable rate transmission techniques to configure different channels with different qualities of service. In another example, the application layer management means imparts application level awareness through a passive label mechanism, real-time optimization or near real-time optimization of currently available transmission sources. In this case, the application layer management means may use one or more attributes selected from the group consisting of throughput, link quality and cost per bit to vary a transmission bit rate. Alternatively, the application layer management means may reconfigure pair-wise capacity in the optical transmission system in response to time-of-day demands. According to another alternative, the application layer management means enables an energy-efficient mode of operation when a computing or a communication load is below a given threshold so that the optical transmission system is run at a lower speed with a concomitant decrease in energy needs.

In a further example, the application layer management means is configured to map applications to transmission channels. In this case, the mapping may be based on one or more transmission channel attributes, including tolerance to loss, time of day flexibility, cost metric and energy efficiency. Here, different quality of service classes may be defined based on different combinations of the transmission channel attributes.

According to a further example, the application layer management means is configured to perform a link mode request operation that determines a data rate to be supported based on link margin for different data rates. Alternatively, the application layer management means is configured to map different applications to different transmission classes of service. In this case, the different transmission classes of service may be based on one or more of data throughput rate, guaranteed error rates, latency and cost.

BRIEF DESCRIPTION OF THE DRAWINGS

FIG. 6 illustrates a timing diagram of link negotiation and setup in accordance with an aspect of the disclosure.

DETAILED DESCRIPTION

The aspects, features and advantages of the disclosure will be appreciated when considered with reference to the following description of embodiments and accompanying figures. The same reference numbers in different drawings may identify the same or similar elements. Furthermore, the following description does not limit the disclosure; rather, the scope is defined by the appended claims and equivalents.

In one aspect, a system is provided in which the application layer has awareness of and controls the underlying transmission rate and quality, thereby adapting the application to fully utilize the transmission capacity of the channel. Another aspect enables QoS-driven dynamic transmission channels. For instance, a transmission profile may be assigned with different QoS classes to different transmission channels. The different channels may have different transmission profiles based on parameters such as guaranteed bit error rate (BER), latency, energy-efficiency and throughput.

Figure 1:
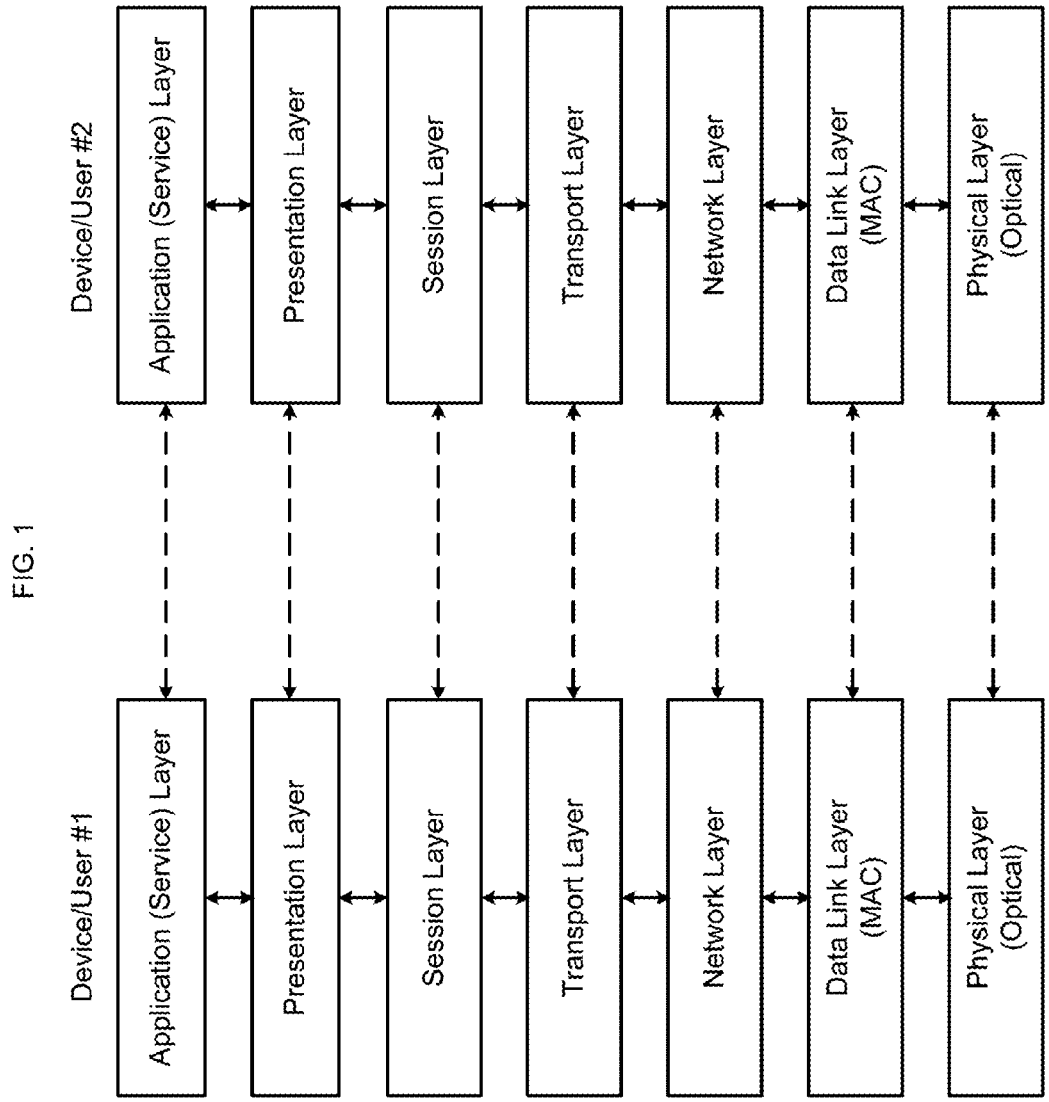
FIG. 1 illustrates an example of a network layer architecture for use with aspects of the disclosure.

The overall transmission architecture may be viewed as having multiple layers. One exemplary transmission architecture is the Open Systems Interconnection ("OSI") Basic Reference Model, which provides a layered, abstract description for communication systems and computer networks as shown in FIG. 1. Here, each layer comprises a collection of related functions that provides services to the layer above it and receives services from the layer below it. In such a layered communication system, there are different processing entities in each layer at both ends of the system. Alternative network layer configurations based on consolidation of functionalities in two or more layers into one layer are possible, depending on end user requirements.

A processing entity in each layer at one end of a communication system normally communicates with a processing entity at the same layer at the other end of the communication system. For example the physical layer at one end of the communication system is peer to the physical layer at the other end of the communication system as illustrated in FIG. 1. The logical links between corresponding processing entities at a given layer are shown by the dashed lines in FIG. 1. There may be different communication protocols defined for each layer. The peers at each layer communicate with each other using these protocols. Also each peer entity normally communicates with the processing entities in the layer above it and the layer below it.

According to one embodiment, the system enables the application (service) layer to take advantage of the highest possible throughput rate for the given transmission link. It also enables the application or service layer to take advantage of "stranded margin" in an optical link due to temporal and statistical factors. According to one aspect, stranded margin refers to the difference in optical performance (typically measured by Q), between what an optical system is capable of and what is required for a particular deployment. For instance, in one example a system may have a required Q of 12 dB, but a limit of 14 dB. In this example, there would be 2 dB of stranded margin. Examples of factors that contribute to stranded margin are manufacturing margin, equipment aging margin, temperature margin, margin for transient events, fiber aging margin and worst-case optical impairment margin.

Through initial negotiation and periodic management messaging protocols as described herein, the transmission rate may be increased to the maximum possible rate that the channel can support while meeting application layer QoS requirements at that point.

Another aspect enables the application layer to map different applications to different transmission classes of service. These can be classified based on data throughput rate, guaranteed error rates, latency, cost, etc. This provides flexibility to the application layer to map some loss tolerant applications to a lower cost (per bit) transmission class that is more lossy than a higher cost transmission class. In contrast, in current operational techniques all transmission channels are characterized by the same metrics and provide no ability to offer tiered classes of service.

The technology according to this disclosure enables network operators to employ a dynamic optical layer with the ability to reconfigure the system's pair-wise capacity in response to time-of-day demands. For example, time-insensitive machine-machine traffic can be increased at night or other off-peak times when normal user traffic loads ebb. This dynamic reconfiguration is inefficient unless the application layer has awareness of the transmission layer capabilities. Such an architecture enables an energy-efficient mode of operation when computing and communication load is low and the network can be run at a lower speed with a concomitant decrease in energy needs.

Figure 2:
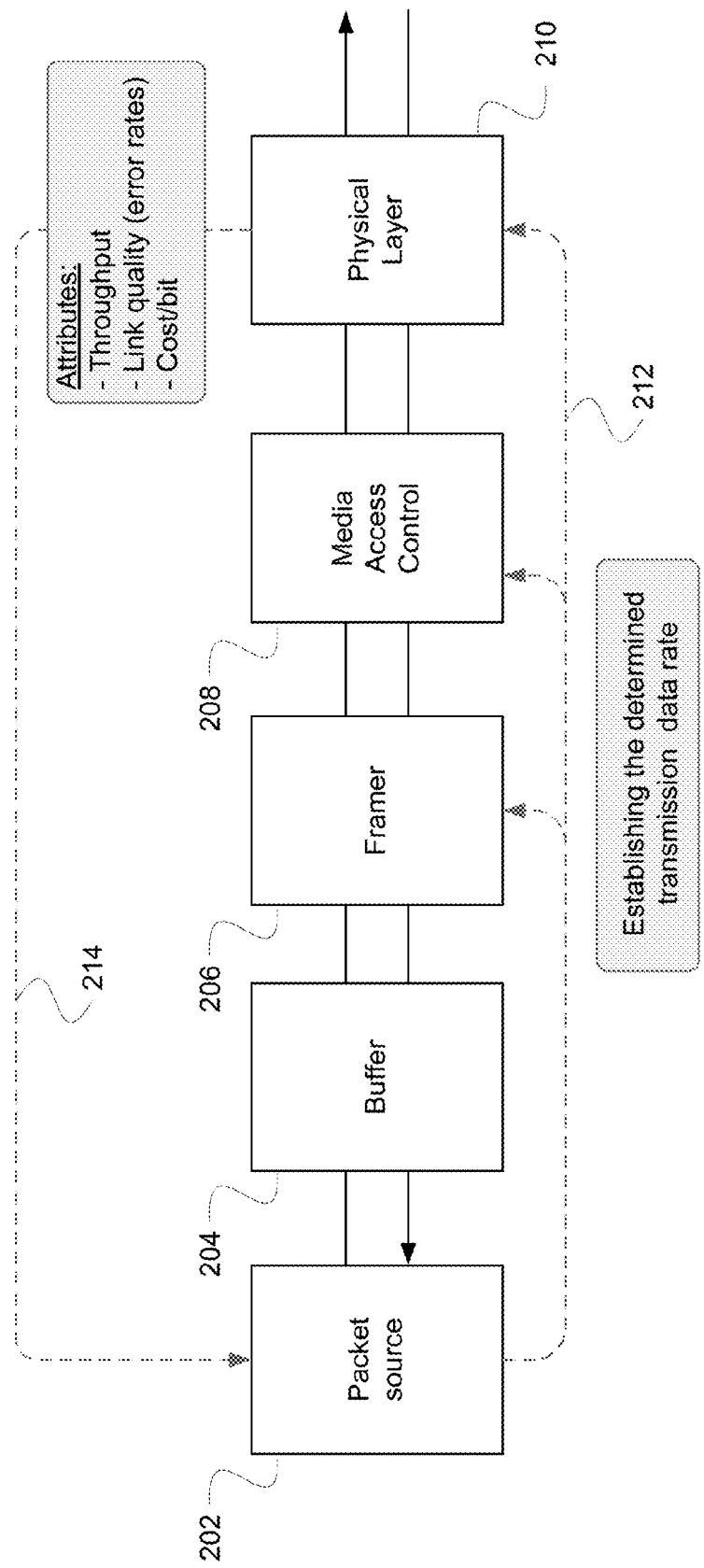
FIG. 2 illustrates a feedback system configuration in accordance with aspects of the disclosure.

FIG. 2 illustrates one example of a system 200 in accordance with aspects of the disclosure. The system 200 illustrates feedback loops for relaying information regarding the transmission channel to the Media Access Control (MAC) layer and the packet source. As shown, the system 200 includes a packet source 202, a buffer 204, a framer 206, MAC 208 and a physical layer 210. The system 200 provides for variable rate transmission. The physical layer (optical layer) 210 includes an optical system that can change the transmission data rate based on the channel conditions.

Variable rate transmission can be achieved using a number of techniques. For instance, DWDM may be employed, where different incoming data streams are mapped to different wavelengths and then multiplexed on to a single fiber. The DWDM transmission of multiple wavelengths with each wavelength may be performed using coherent transmission techniques in conjunction with a variable modulation format (e.g., BPSK, QPSK, 16-QAM, etc). Here, each wavelength can have its own data rate and modulation format and can be independent of the other wavelengths. Another transmission technique is Orthogonal Frequency Division Multiplexing (OFDM), in which each subcarrier can be independently modulated. Alternatively, variable-bit-rate time-division-multiplexed (TDM) serial transmission may be employed, where the serial bit-rate is changeable based on transmission channel quality and application-layer requirements. Polarization division multiplexing (PDM) is another alternative, as well as any combination of WDM, OFDM, TDM and PDM.

Another aspect of the disclosure enables a rate change, not in real-time, but over much longer timeframes, such as hours or even months. The triggers for this longer time scale adjustment include (a) link margin degradation over time and (b) changes to traffic demand and QoS profiles.

Figure 3:
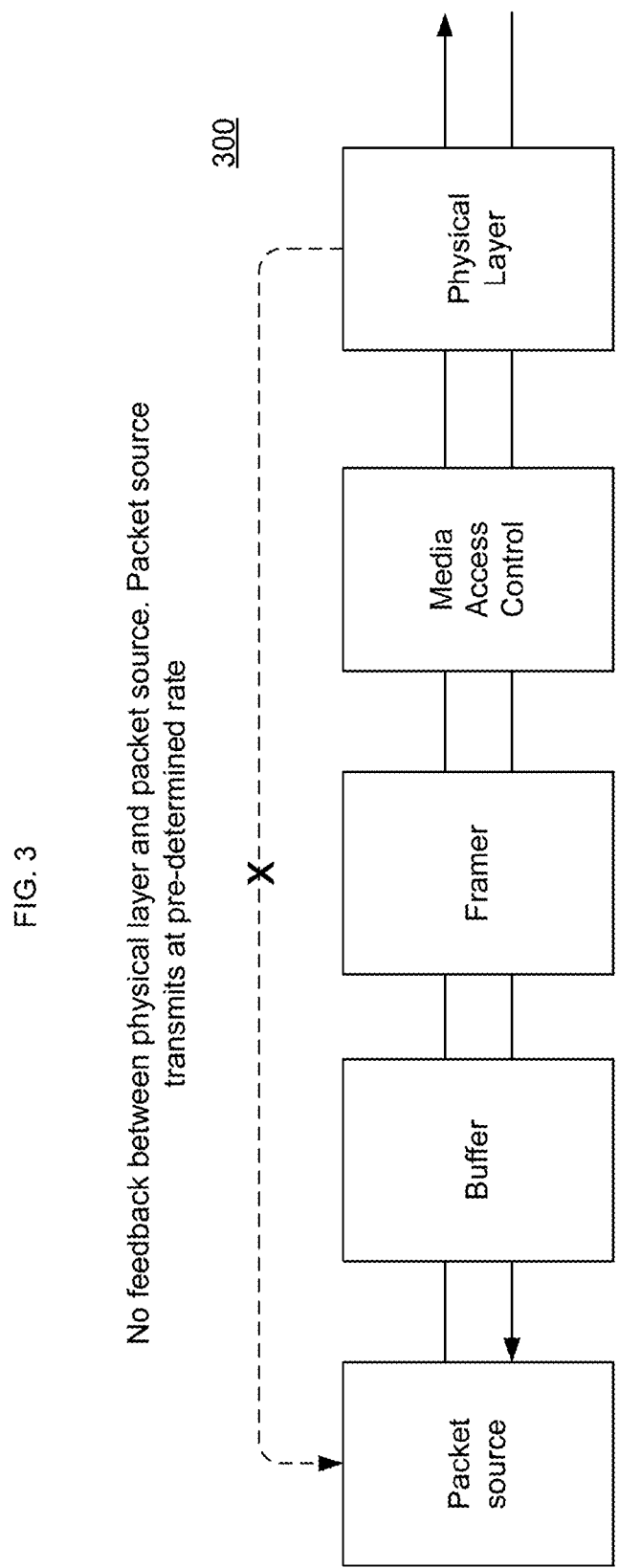
FIG. 3 illustrates a non-feedback system configuration.

Returning to FIG. 2, it is shown that the functional blocks of the system 200 pass information between the packet source 202 and the physical layer 210. As shown by the lower dashed line 212, the transmission data rate is determined according to information passed from the packet source 202 to the framer 206, MAC 208 and physical layer 210. And attributes such as throughput, link quality (e.g., error rate) and cost per bit are passed from the physical layer 210 to the packet source 202 as shown by dashed line 214. This is in contrast to system 300 shown in FIG. 3, where there is no feedback between the physical layer and the packet source. Here, the packet source transmits at some pre-determined rate, and the arrows indicate the flows of traffic to and from the packet source.

Figure 4:
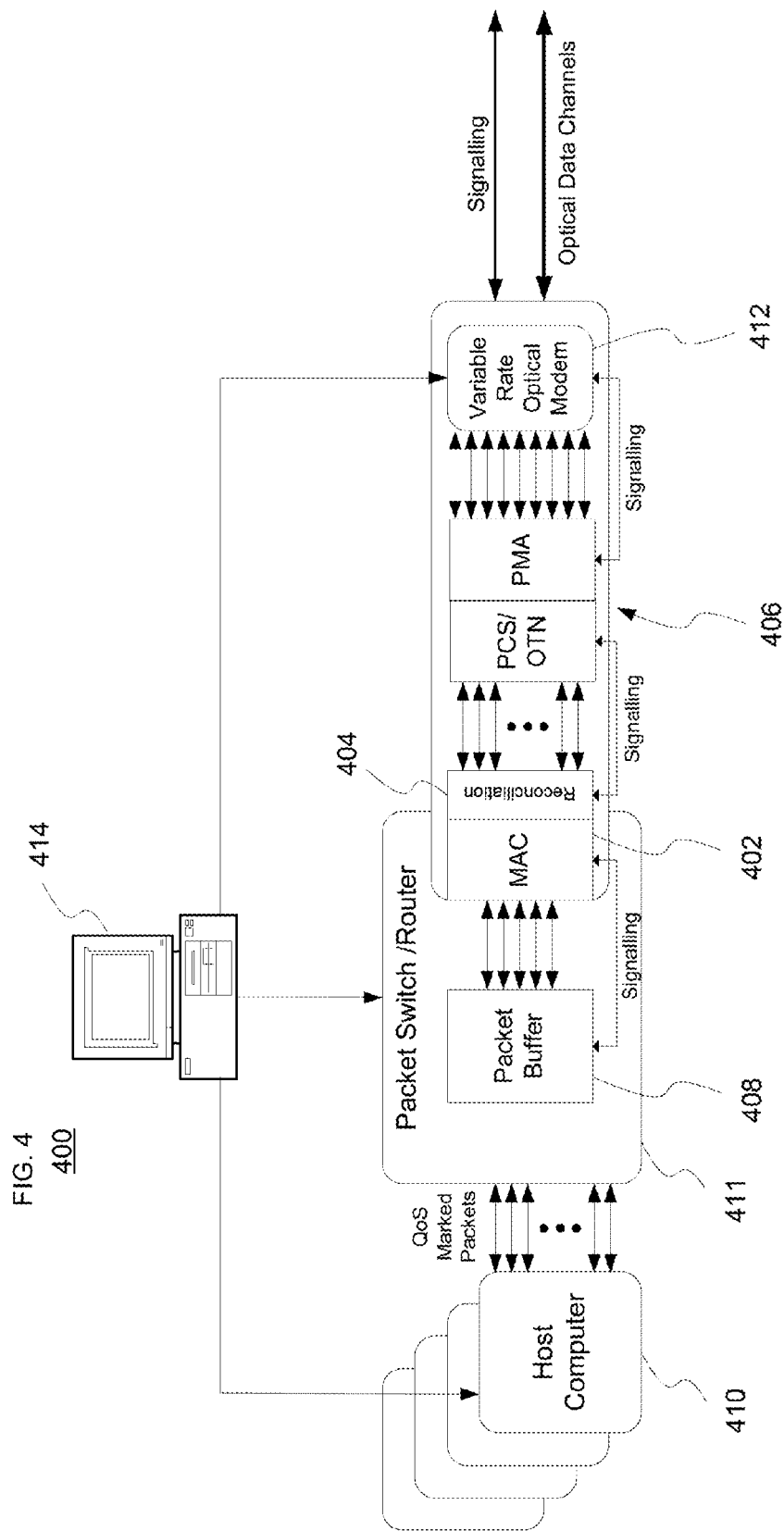
FIG. 4 illustrates one example of a variable link control system in accordance with aspects of the disclosure.

According to one embodiment, the system employs a variable link control layer to enable optimized transmission. One example is shown in FIG. 4. Here, system 400 includes a variable link control layer that comprises a media access control element 402, a reconciliation sub-layer 404, a framing element 406 and a packet buffer 408. These elements together enable the mapping from a packet source, such as one of the host computers 410, to a physical transmission system 412 with a variable rate.

The packet buffer 408 is shown as being part of packet switch/router (packet switch device) 409, which communicates with the host computer(s) 410 using QoS marked packets. The QoS may be marked using a Class of Service field in the packet header. The physical transmission system 412 may be implemented as a variable rate optical modem as shown in FIG. 4. Also, the framing element 406 may include a physical coding sublayer (PCS) and optical transport network (OTN) sublayer, which may be coupled to a physical medium attachment (PMA) sublayer. In one embodiment, the MAC, PCS/OTN, PMA and the variable rate optical modem may all be part of the packet switch/router 409.

The variable link control layer is also responsible for advertising the capability of the variable-bit-rate optical transmission layer, performing initial and periodic queries of the transmission medium state to determine possible transmission modes at various QoS profiles, and negotiating the transmission rate with the application layer. This control layer can be achieved using multiple architectural solutions.

FIG. 4 illustrates one such architectural solution, which incorporates a centralized controller 414. In this architecture, the centralized controller 414 communicates with all elements that have variable rate awareness or need to participate in order to establish the link (application layer, packet switch and transmission layer) and establish the appropriate data rate, service profiles and QoS markings. The centralized controller 414 may comprise a processor such as a CPU, which may be part of a server, PC or other computer. According to one aspect, the centralized controller includes configuration profiles to indicate which elements have variable bit rate awareness and the limits of the variability. With such configuration information, the centralized controller can balance between the ability of the transmission link and the traffic demand to create a match. It may essentially function as an arbiter with full knowledge of all elements, thus being able to optimize the best configuration. An extension of the centralized controller architecture may span multiple network elements (network wide centralized controller).

Figure 5:
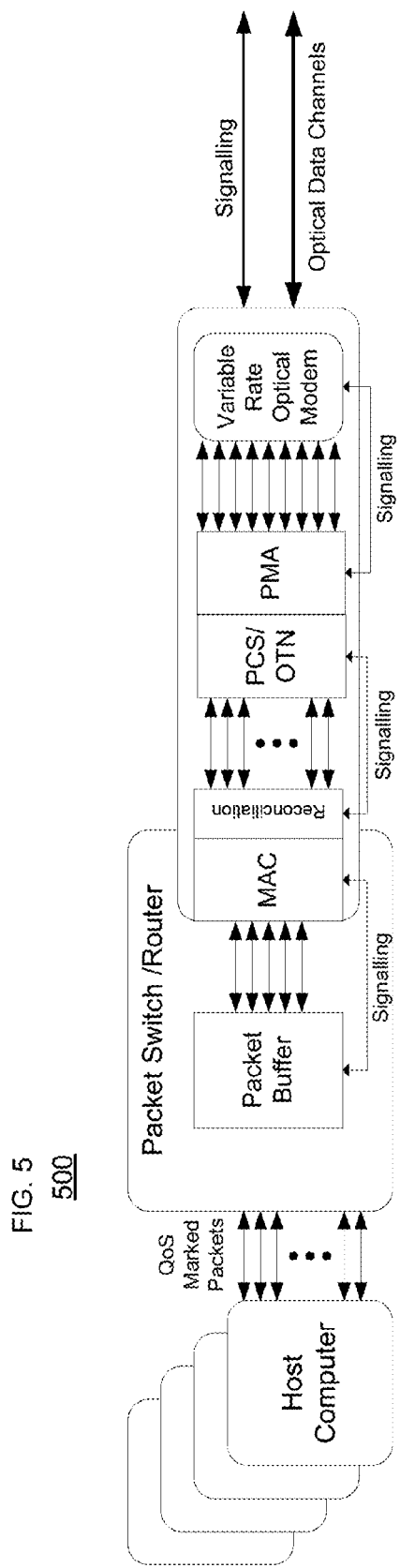
FIG. 5 illustrates another example of a variable link control system in accordance with aspects of the disclosure.

FIG. 5 illustrates an alternative architecture 500, which provides for distributed control of the system. In this architecture, there is no centralized controller to coordinate the data rates, service profiles and the appropriate QoS markings. These parameters are set up using direct signaling between functional blocks, e.g., between two transmission elements, between the packet switch and transmission layer and between the packet switch and the application layer. In contrast to the centralized controller architecture, in this configuration, the individual elements are configured to talk to each other directly, such as via the signaling paths shown in the figure.

Another alternative is a hybrid controller system, which is a combination of the centralized and distributed controller architectures of FIGS. 4 and 5. Here, control of some elements is centralized while others are based on a distributed control. In one embodiment, the link between packet switch/router and variable rate optical modem may be distributed and the host computer and the packet switch may be under centralized control.

Whether under centralized control, distributed control or a hybrid thereof, a method of signaling is required between the various functional elements to communicate the key parameters, establish the desired data rate and profile, and send confirmation messages of the established link. In order to establish the transmission link, a number of methods are possible and they can be broadly classified as either in-band signaling or out-of-band signaling. In-band signaling refers to the use of the data channel itself for signaling purposes. The signaling can be established using a predetermined low (base) rate at which the link is generally guaranteed to work. One example of a base rate is 50 Gb/s. There is no requirement of a minimum percentage of time that it will work. Rather, it may be a function of age of the system. For instance, as the system ages, the link loses its margin due to normal aging or fiber repairs. Out-of-band signaling refers to using a communication scheme that is separate from the data channel to transmit and receive the signaling information. Some examples of out-of-band signaling are digital overhead bytes, AM tone or FM tone. FM tone is preferred in many situations because it is the least susceptible to link impairments and provides the most tolerant signal. Digital overhead bytes work in other situations, such as when the base link is already established. AM tone is susceptible to link noise, and thus may not be used in situations where this is problematic.

The application layer is the source of the packets to be transmitted across the network, and awareness at this layer regarding the bandwidth throughput and quality of transmission channels available enables the applications to pick the appropriate transmission channels. Application-level awareness can be imparted through a passive label mechanism, or through a real-time or near real-time optimization of currently available transmission resources. In one example, with a passive label mechanism the incoming packets are labeled (tagged, marked) using a Class of Service (or Quality of Service/QoS) Profile label (tag, marker) signifying which service profile that packet falls into. QoS profiles are often based on a combination of factors such as tolerance to loss, cost etc. In this passive label mechanism example, the incoming packets are assigned these labels without interaction with (or feedback from) the physical layer and the controller does it best to map it to available transmission resources. In real-time or near-real time optimization, the assignment of labels may depend on the available resources on the transmission side and a feedback loop exists between the two. For instance, as shown in FIG. 2, attributes such as throughput, link quality and the cost per bit may be passed from the physical layer to the packet source, and the control scheme (central, distributed or hybrid) uses this information to efficiently vary the bit rate.

The architecture in accordance with the present disclosure enables an optimal mapping of applications to appropriate transmission channels. This mapping can be based on one or more of the following attributes of the transmission channel: tolerance to loss, time of day flexibility, cost metric and energy efficiency. Regarding tolerance to loss, transmission channels can be run at higher data rates if there is tolerance for a higher loss. Applications that can handle some errors can take advantage of higher transmission rates when needed. Loss tolerance can come in two forms—dribbling errors due to the noise floor or burst errors due to temporal events such as Polarization Mode Dispersion (PMD) events. PMD events refer to bit errors that occur because of a random occurrence resulting from polarization state of light in the fiber and stresses in the fiber that cause polarization changes.

Regarding day of time flexibility, applications that have flexibility in terms of scheduling the time and amount of bandwidth required can take advantage of variable rate transmission systems and suitable environmental factors (such as lower temperature) to run the transmission link at a higher or lower speed. The use of variable rate transmission systems enables a more efficient method of providing a metric for the cost of a link for routing considerations. With non-variable (fixed) rate transmission, the link cost advertised for routing is largely independent of the link distance. In contrast, with variable rate optics the shorter links have higher capacity and thereby a lower cost/bit than the longer links. This enables the use of a cost metric that is a function of distance, and thus advertises a true and optimized cost to the application layer which can take advantage of these cost metrics.

Regarding energy efficiency, there are some situations where only a fraction of the maximum possible data rate is required as the network traffic is not high. One example of such fractional use is diurnal variation. This may include a situation where user traffic is found to be low at night, or where links that are used for occasional data replication lie idle at other times. For such links, lowering the transmission rate may offer benefits in terms of energy consumption. Energy efficiency can be achieved using lower data rates by bypassing regeneration sites (for a longer unregenerated reach), or using simpler modulation schemes and bypassing some error coding/decoding stages.

The attributes described above may be traded off against one another, and a few QoS classes may be defined based on a combination of the attributes. Examples of tradeoffs include cost versus loss tolerance (occasional errors), and capacity versus loss tolerance. The application layer can then map the applications/services to these classes. In this situation, the mapping refers to labeling packets according to their value and tolerance to being dropped/lost (and hence retransmitted). The centralized controller knows how many links (and corresponding bandwidth) may be associated with high quality transmission and how many links may be associated with poorer quality. The centralized controller is configured to map the high priority packets to the good lanes and the low priority packets to the low quality lanes.

There are multiple embodiments possible for the level (granularity) at which these QoS classes can be defined. In one case, the entire transmission fiber is operated at full capacity. In another embodiment, different wavelengths can have independently configurable QoS profiles. And in yet another embodiment, if a modulation scheme is used such that each transmission wavelength is composed of multiple subcarriers (e.g., optical OFDM), each of the subcarriers can have a different QoS profile. According to one embodiment, the system is configured to generate QoS profiles based on link margin and link quality (e.g., frequent fiber cuts, repairs, etc.).

FIG. 6 illustrates an exemplary timing diagram 600 showing initial link negotiation and setup, followed by subsequent periodic link updates. As shown at time $t_1$, the transmission layer first advertises its capabilities (e.g., link quality and capability) to the application layer. At time $t_2$, the application layer acknowledges the advertisement from the transmission layer and returns received signal quality. The application layer also advertises its capabilities, for instance to define appropriate traffic classes and send a request to the transmission layer to establish the link based on those parameters. The transmission layer receives this information at time $t_3$. At time $t_4$, the transmission layer acknowledges the information received from the application layer, and returns a link mode request. The link mode request operation may be computed by the centralized controller or by another device. A link mode request operation includes a process by which the controller takes raw input from the link (link margin for different data rates), and based on that information, computes the data rate to be supported. This information is received by the application layer at time $t_5$. The application layer then starts transmitting at time $t_6$ using the negotiated link mode, and the transmission layer receives the information at time $t_7$. Data transmission across the optical channel(s) from one device to another takes place from $t_8$ to $t_9$. Periodic link negotiation takes place as shown to ensure an optimal match between link conditions and application requirements is maintained.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A variable link control apparatus for application layer control of an optical transmission system, the variable link control apparatus comprising:
a media access control element;
a reconciliation sub-layer coupled to the media access control element;
a framing element coupled to the media access control element; and
a packet buffer coupled to the media access control element;
wherein the variable link control apparatus is configured to map from a packet source to a physical transmission system with a variable rate, including managing packet transmission in an optical network using one or more variable rate transmission techniques to configure different channels with different qualities of service, and further including negotiating the transmission rate with the application layer;
wherein the application layer has dynamic awareness of current capabilities of the transmission system through a feedback loop from a physical layer to the packet source, the capabilities being variable, and applications select particular transmission channels based on the awareness of the current capabilities of the transmission system;
wherein the application layer attaches a quality of service label to each respective packet based on the current capabilities of the transmission system, wherein each quality of service label signifies the service profile of the respective packet; and
wherein the packet buffer is configured to communicate with one or more host computers using the quality of service labeled packets.

2. A variable link control apparatus for application layer control of an optical transmission system, the variable link control apparatus comprising:
a media access control element;
a reconciliation sub-layer coupled to the media access control element;
a framing element coupled to the media access control element; and
a packet buffer coupled to the media access control element;
a centralized controller configured to communicate with one or more host computers, a variable rate optical modem, and at least one of the packet buffer and the media access control element to establish one or more data rates, service profiles and quality of service markings;
wherein the variable link control apparatus is configured to map from a packet source to a physical transmission system with a variable rate, including managing packet transmission in an optical network using one or more variable rate transmission techniques to configure different channels with different qualities of service, and further including negotiating the transmission rate with the application layer; and
wherein the application layer has dynamic awareness of current capabilities of the transmission system through a feedback loop from a physical layer to the packet source, the capabilities being variable, and applications select particular transmission channels based on its awareness of the current capabilities of the transmission system.

3. The variable link control apparatus of claim 2, wherein the centralized controller includes configuration profiles to indicate which elements have variable bit rate awareness and limits of such variability.

4. The variable link control apparatus of claim 3, wherein the centralized controller is configured to determine a balance between an ability of a transmission link and traffic demand to create a match.

5. A variable link control apparatus for application layer control of an optical transmission system, the variable link control apparatus comprising:
a media access control element;
a reconciliation sub-layer coupled to the media access control element;
a framing element coupled to the media access control element; and
a packet buffer coupled to the media access control element;
wherein the variable link control apparatus is configured to map from a packet source to a physical transmission system with a variable rate, including managing packet transmission in an optical network using one or more variable rate transmission techniques to configure different channels with different qualities of service, and further including negotiating the transmission rate with the application layer;
wherein the application layer has dynamic awareness of current capabilities of the transmission system through a feedback loop from a physical layer to the packet source, the capabilities being variable, and applications select particular transmission channels based on the awareness of the current capabilities of the transmission system;
wherein one or more data rates, service profiles and quality of service labels are arranged using direct signaling between corresponding functional blocks in various layers; and
wherein the application layer attaches the label to each respective packet based on the current capabilities of the transmission system.

6. A variable link control apparatus for application layer control of an optical transmission system, the variable link control apparatus comprising:
a media access control element;
a reconciliation sub-layer coupled to the media access control element;
a framing element coupled to the media access control element; and a packet buffer coupled to the media access control element;
wherein the variable link control apparatus is configured to map from a packet source to a physical transmission system with a variable rate, including managing packet transmission in an optical network using one or more variable rate transmission techniques to configure different channels with different qualities of service, and further including negotiating the transmission rate with the application layer;
wherein the application layer has dynamic awareness of current capabilities of the transmission system through a feedback loop from a physical layer to the packet source, the capabilities being variable, and applications select particular transmission channels based on the awareness of the current capabilities of the transmission system; and
wherein the media access control element is part of a packet switch device, and the variable link control apparatus further comprises:
a centralized controller configured to communicate with one or more host computers and the packet switch device; and
one or more links between the packet switch device and a variable rate optical modem.

7. A variable link control system, comprising:
a media access control element;
a reconciliation sub-layer coupled to the media access control element;
a framing element coupled to the media access control element;
a packet buffer coupled to the media access control element; and
a variable rate optical modem coupled to the framing element;
wherein the variable link control system is configured to map data from a packet source to the variable rate optical modem by using one or more variable rate transmission techniques to configure different channels with different qualities of service; and
wherein the system is configured to:
advertise capabilities of the variable rate optical modem;
perform initial and periodic queries of a transmission medium state to determine possible transmission modes at various quality of service profiles;
negotiate a transmission rate with an application layer
provide awareness of current capabilities of the transmission system to the application layer through a feedback loop from a physical layer to the packet source, the capabilities being variable; and
enable applications to select particular transmission channels based on the current capabilities of the transmission system.

8. A variable link control system, comprising:
a media access control element;
a reconciliation sub-layer coupled to the media access control element;
a framing element coupled to the media access control element;
a packet buffer coupled to the media access control element;
a variable rate optical modem coupled to the framing element; and
a centralized controller configured to communicate with one or more host computers, the variable rate optical modem, and at least one of the packet buffer and the media access control element to receive information used to establish one or more data rates, service profiles and quality of service markings;
wherein the variable link control system is configured to map data from a packet source to the variable rate optical modem by using one or more variable rate transmission techniques to configure different channels with different qualities of service, and further is configured to negotiate a transmission rate with the application layer; and
wherein the application layer has dynamic awareness of current capabilities of the transmission system through a feedback loop from a physical layer to the packet source, the capabilities being variable, and applications select particular transmission channels based on the awareness of the current capabilities of the transmission system.

9. The variable link control system of claim 8, wherein the centralized controller includes configuration profiles to indicate which elements have variable bit rate awareness and limits of such variability.

10. A variable link control system, comprising:
a media access control element;
a reconciliation sub-layer coupled to the media access control element;
a framing element coupled to the media access control element;
a packet buffer coupled to the media access control element; and
a variable rate optical modem coupled to the framing element;
wherein the variable link control system is configured to map data from a packet source to the variable rate optical modem by using one or more variable rate transmission techniques to configure different channels with different qualities of service, and further is configured to negotiate a transmission rate with the application layer;
wherein signaling is performed between various layers of the system to communicate parameters, to establish a data rate and corresponding profile, and to send confirmation messages of an established link; and
wherein the application layer has dynamic awareness of capabilities of the transmission system through a feedback loop from a physical layer to the packet source, the capabilities being variable, and applications select particular transmission channels based on the awareness of the current capabilities of the transmission system.

11. The variable link control system of claim 10, wherein the signaling is established using a predetermined base rate.

12. The variable link control system of claim 10, wherein the signaling is out-of-band signaling.

13. The variable link control system of claim 12, wherein the out-of-band signaling employs an FM tone.

14. A variable link control apparatus for application layer control of an optical transmission system, the variable link control apparatus comprising:
a media access control element;
a reconciliation sub-layer coupled to the media access control element;
a framing element coupled to the media access control element;
a packet buffer coupled to the media access control element, wherein the packet buffer is configured to communicate with one or more host computers using quality of service labeled packets; and
application layer management means for mapping data from a packet source to a physical transmission system with a variable rate;
wherein the variable link control apparatus is configured to negotiate a transmission rate with the application layer;

wherein the application layer management means imparts dynamic application level awareness of current capabilities of the transmission system through a real-time optimization or near real-time optimization of currently available transmission sources, the real-time or near real-time optimization including a feedback loop from a physical layer to the packet source, wherein applications select particular transmission channels based on the awareness of the current capabilities of the transmission system, and wherein the application layer attaches a quality of service label to each respective packet based on the current capabilities of the transmission system, wherein each quality of service label signifies the service profile of the respective packet.

15. The variable link control apparatus of claim 14, wherein the application layer management means uses one or more attributes selected from the group consisting of throughput, link quality and cost per bit to vary a transmission bit rate.

16. The variable link control apparatus of claim 14, wherein the application layer management means reconfigures pair-wise capacity in the optical transmission system in response to time-of-day demands.

17. The variable link control apparatus of claim 14, wherein the application layer management means enables an energy-efficient mode of operation when a computing or a communication load is below a given threshold so that the optical transmission system is run at a lower speed with a concomitant decrease in energy needs.

* * * * *